UNITED STATES PATENT OFFICE.

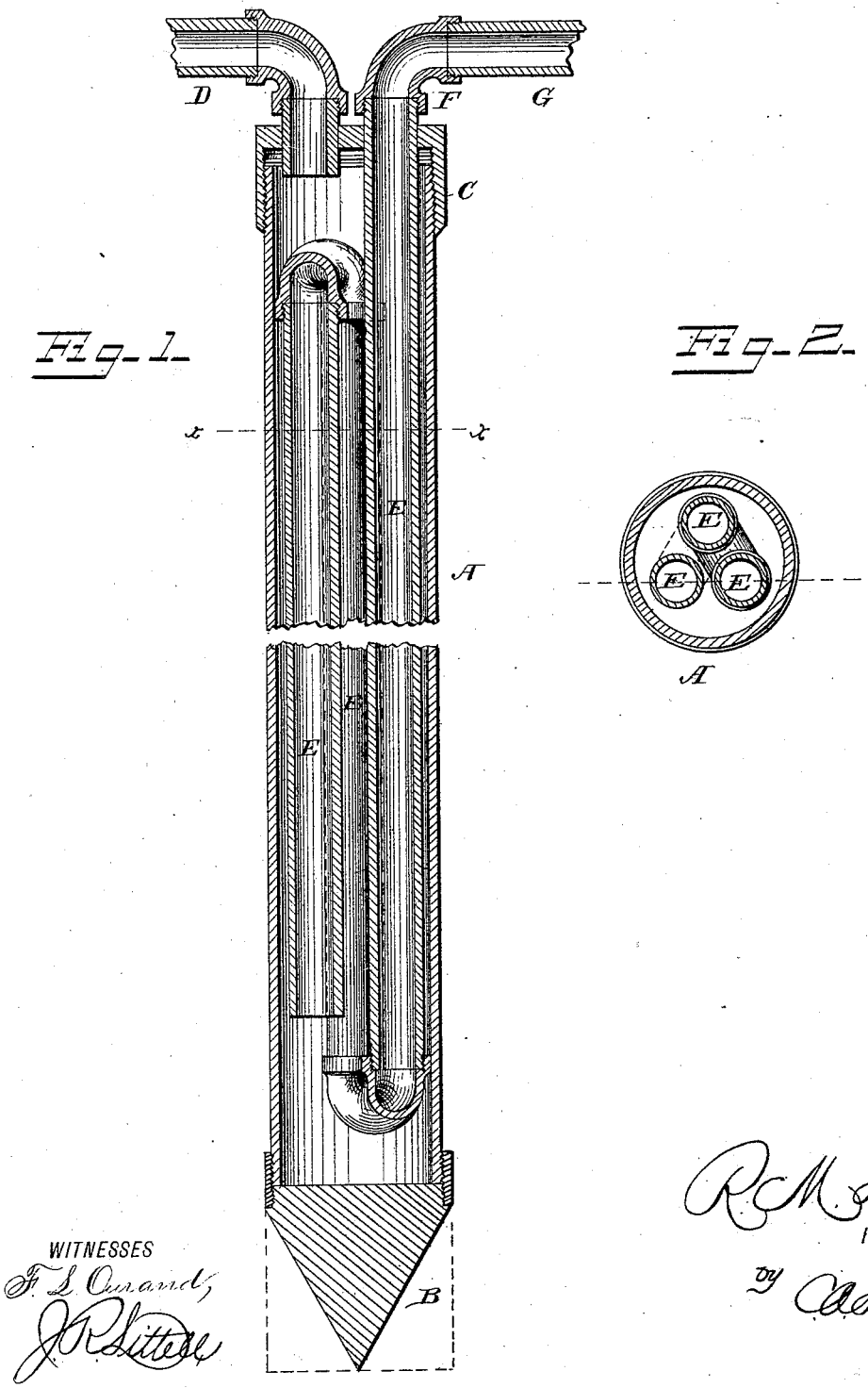

ROBERT M. DOWNIE, OF FALLSTON, PENNSYLVANIA.

APPARATUS FOR COOLING WATER.

SPECIFICATION forming part of Letters Patent No. 285,472, dated September 25, 1883.

Application filed July 17, 1883. (No model.)

*To all whom it may concern:*

Be it known that I, ROBERT M. DOWNIE, a citizen of the United States, residing at Fallston, in the county of Beaver and State of Pennsylvania, have invented a new and useful System and Apparatus for Cooling Water, &c., of which the following is a specification, reference being had to the accompanying drawings.

This invention relates to an improved system of and apparatus for cooling water, air, gases, and other liquids; and it has for its object to produce a device which shall possess superior advantages in point of simplicity, inexpensiveness, and general efficiency, as will be hereinafter fully described, and particularly pointed out in the claim.

In the drawings hereto annexed, Figure 1 is a vertical sectional view, and Fig. 2 is a horizontal sectional view on the line $x$ $x$ in Fig. 1.

The same letters refer to the same parts in both figures.

The purpose of my invention, as stated, is to effect the cooling of water or other liquids; and this I propose to accomplish by conducting such liquids down into the ground to the region of perpetual low temperature, and permitting them there to remain or circulate until the desired reduction in temperature has been effected.

The apparatus of which I propose to avail myself consists of the parts constructed and arranged as I shall now proceed to describe.

A designates a pipe of the necessary length to extend into the ground the desired distance—say from thirty to sixty feet, although these dimensions are by no means to be considered the limits. The said pipe, which may of course consist of any desired number of sections, suitably connected or coupled together, is provided at its lower end with a driving-point, B, of iron or steel, which is connected to the said pipe A in such a manner as to close its lower end tightly, and which serves to protect the lower end of the pipe when the latter is being driven into the ground. The point B may be either conical or it may be provided with a sharp chisel-edge, the latter substantially as shown in dotted lines in Fig. 1. This will be governed, mainly, by the kind of ground into which the pipe A is to be driven. The upper end of the pipe A has a water and air tight flanged cap, C, provided with an inlet-pipe, D, through which the water or other liquid may be admitted into the shell or pipe A.

E designates the outlet-pipe, which starts near the bottom of the pipe or shell A, running from thence nearly to the top of said shell, thence down, and back again to the top, where it extends through the cap C, and is connected by a joint or goose-neck, F, with the delivery-pipe G. Instead of arranging the pipe E as a return-pipe, as herein shown, it may be coiled or otherwise suitably arranged in the shell A, provided only that it shall take the liquid from the bottom of the said shell.

The operation of this invention will be readily understood from the foregoing description, taken in connection with the drawings hereto annexed. The liquid to be cooled, which may be water from a cistern, from a city water-main, or from any other source of supply, will enter the shell A through the inlet-pipe D, pass to the bottom of said shell, where it is cooled by the contact with the latter of the surrounding cold strata, and will finally be drawn off through the outlet-pipe, which takes the liquid from the bottom of the shell, where it is coolest.

In rocky soil and other places where it shall be found not practicable to drive the pipe or shell A, the said shell may be sunk into the ground to the requisite distance by drilling inside the said shell, the driving-point B being then of course dispensed with. In this case the tightly-fitting cap C is also dispensed with and a loose cap or cover substituted. It will also of course be necessary to connect the inlet with the delivery-pipe, or, in other words, to run the liquid to be cooled through a complete pipe, extending from the top of the shell and back. I rely for the cooling of the liquids upon their passage through the strata where the temperature is permanently low.

I am aware that it is not new, broadly, to cool liquids by conducting them into the ground to the region of perpetual low temperature. This, therefore, I do not claim.

I claim as my invention and desire to secure by Letters Patent of the United States—

The combination of the pipe A, the solid driving-point B, closing the lower end of said pipe, the cap C, the supply-pipe D, entering said cap, and the delivery-pipe E, starting near the bottom of shell A, coiled within the same and extending out through the cap C, as and for the purpose set forth.

In testimony that I claim the foregoing as my own I have hereto affixed my signature in presence of two witnesses.

ROBERT M. DOWNIE.

Witnesses:
 JOHN P. EDGAR,
 HARRISON GRAHAM.